Figure 1:
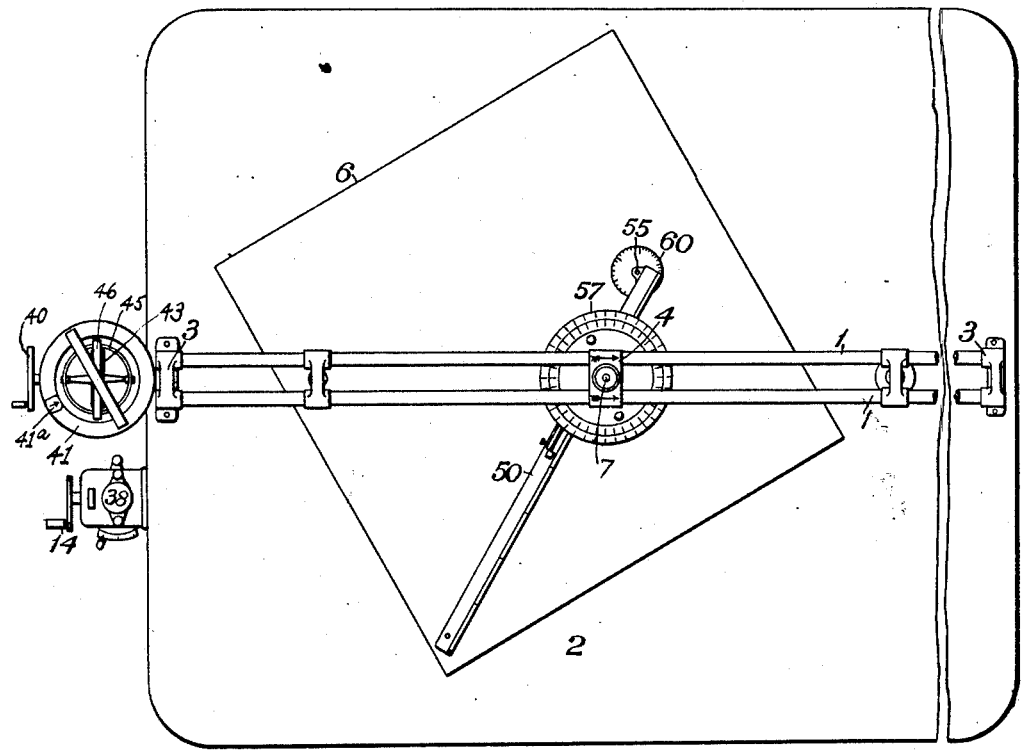

A. H. POLLEN & H. ISHERWOOD.
MEANS AND APPARATUS FOR CHARTING THE POSITIONS OF SHIPS AT SEA.
APPLICATION FILED SEPT. 5, 1913.

1,123,795.

Patented Jan. 5, 1915.

9 SHEETS—SHEET 1.

WITNESSES.
M. R. Manning
E. P. Bernhardt

INVENTORS.
A. H. Pollen
Harold Isherwood
BY Rogers, Kennedy & Campbell ATTYS.

A. H. POLLEN & H. ISHERWOOD.
MEANS AND APPARATUS FOR CHARTING THE POSITIONS OF SHIPS AT SEA.
APPLICATION FILED SEPT. 5, 1913.

1,123,795.

Patented Jan. 5, 1915.
9 SHEETS—SHEET 2.

WITNESSES.
M. R. Manning
E. P. Bernhardt

INVENTORS.
A. N. Pollen
Harold Isherwood

By
Rogers, Kennedy & Campbell ATTYS

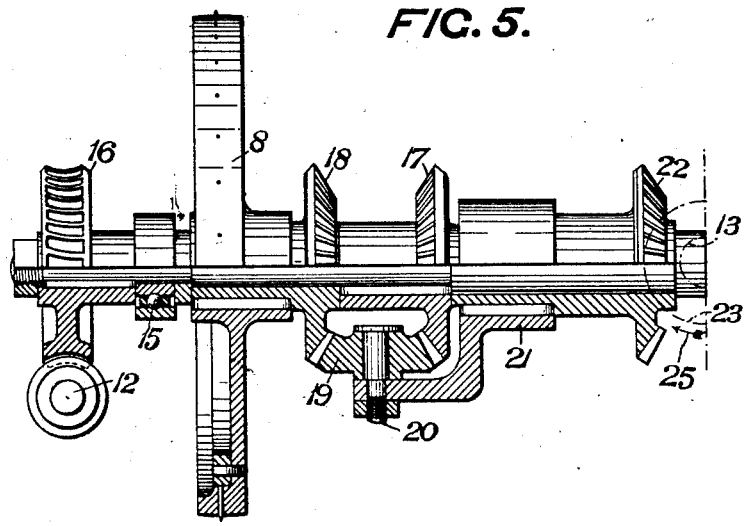
FIG. 5.
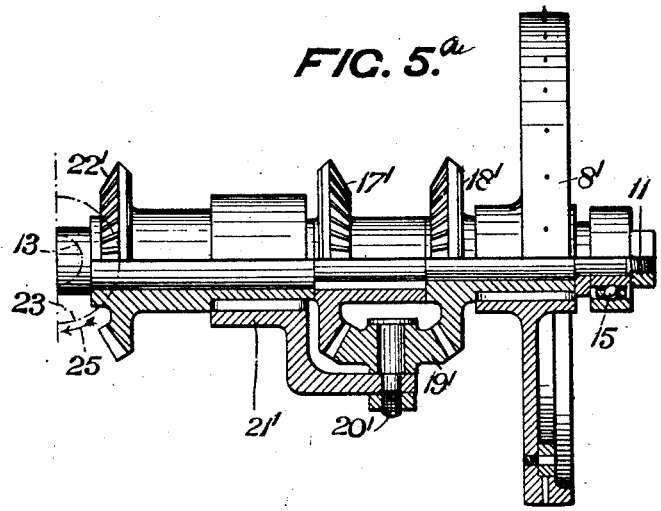
FIG. 5.ᵃ

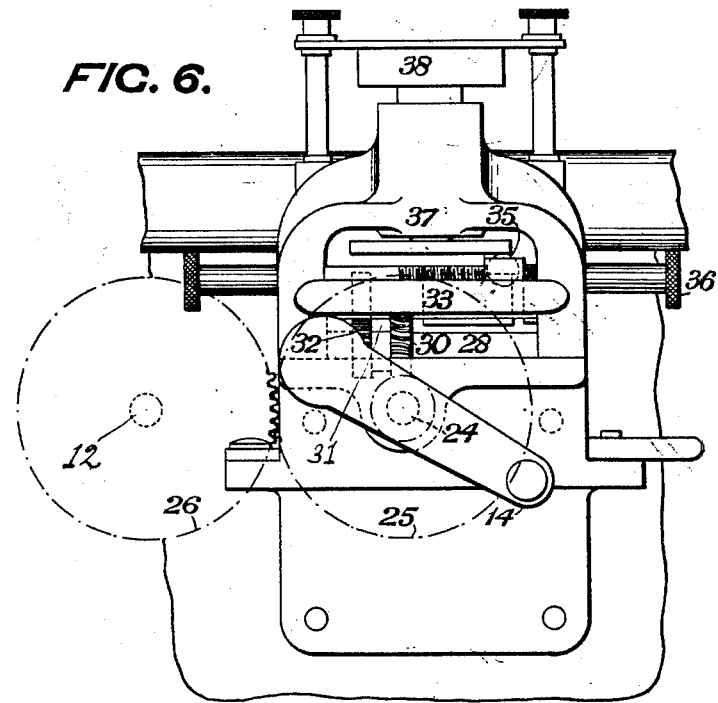
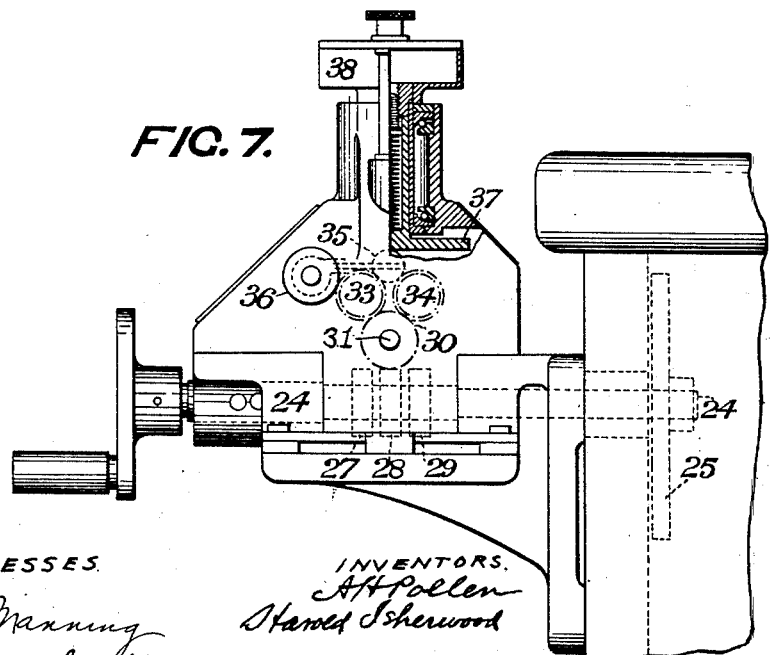

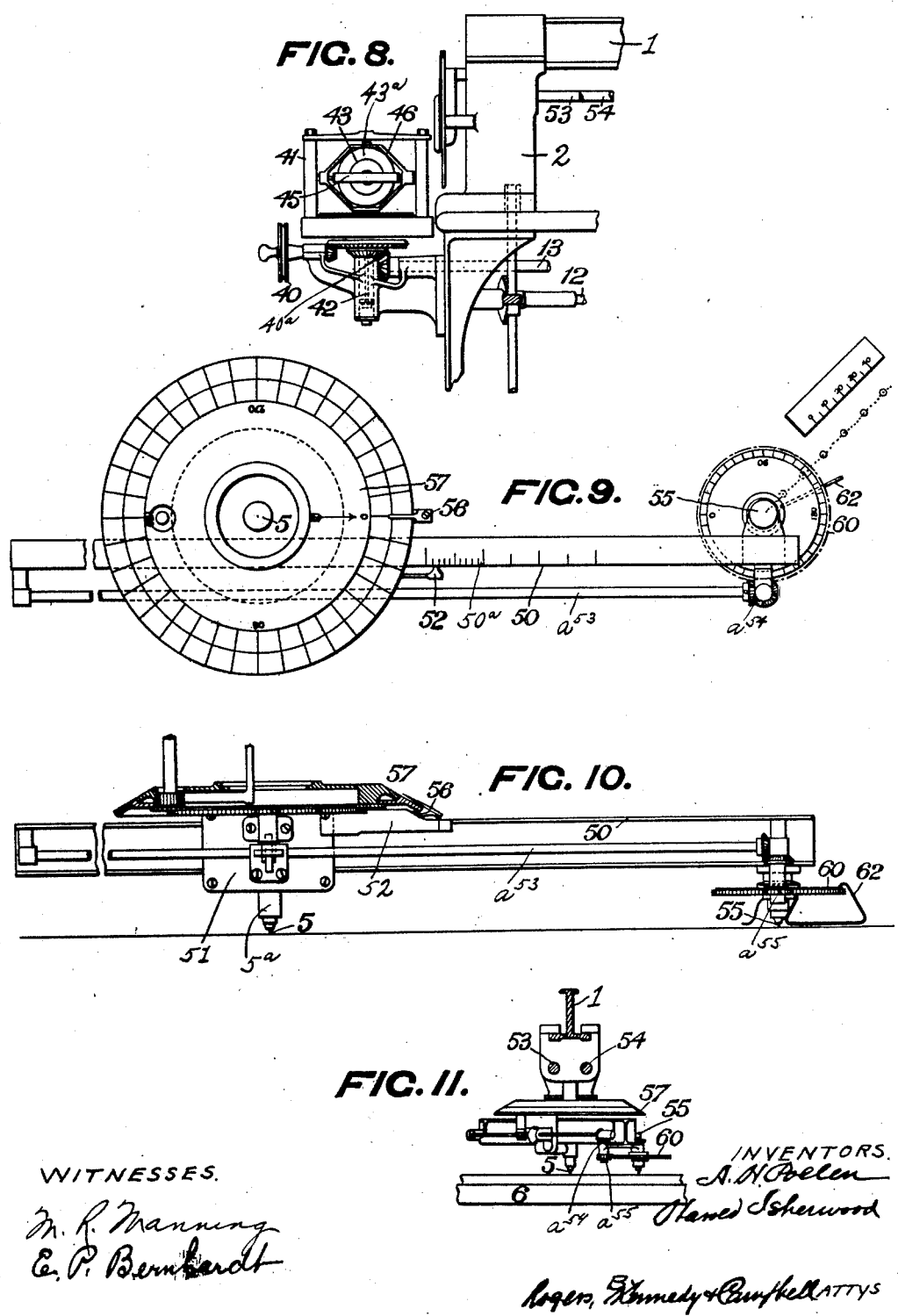

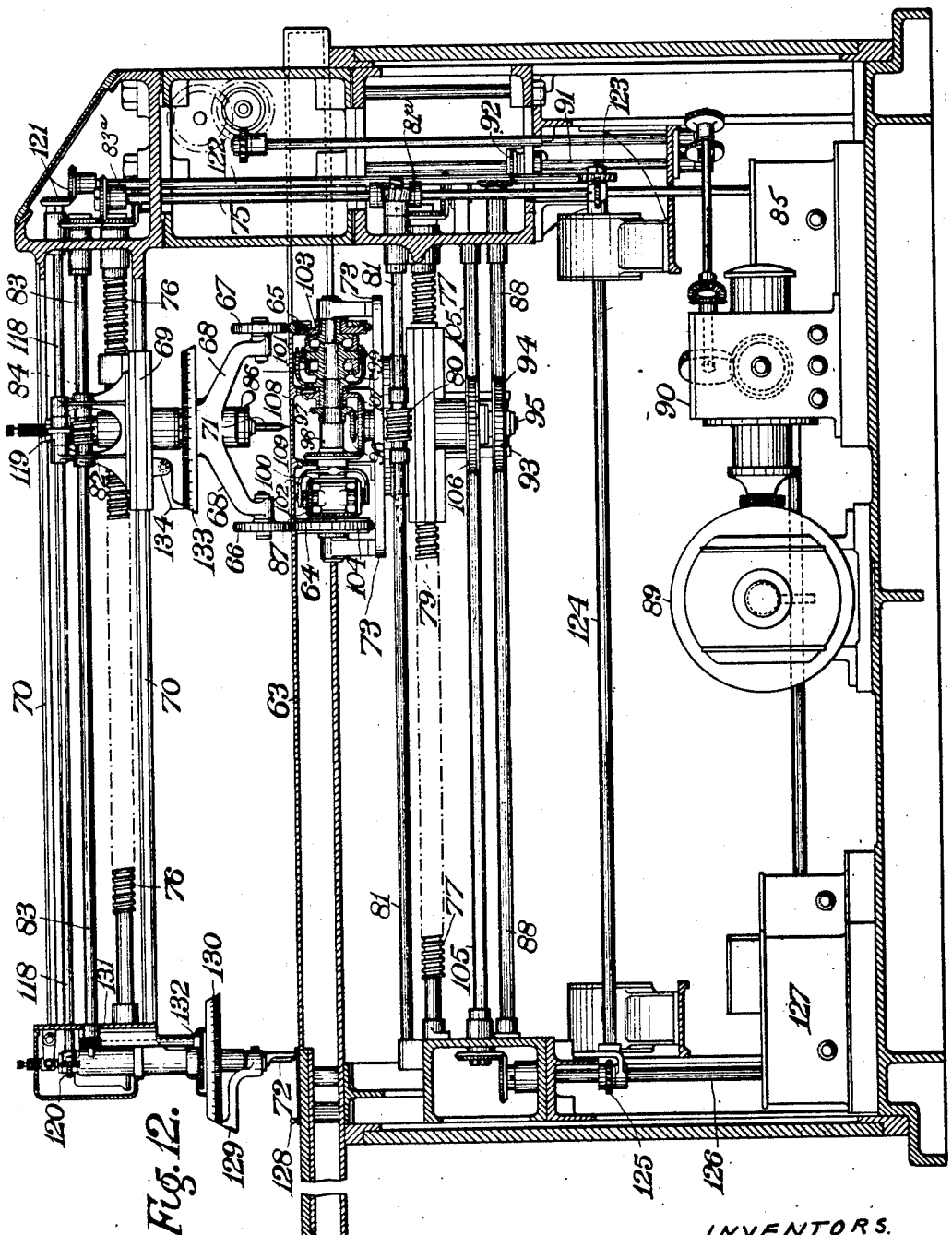

A. H. POLLEN & H. ISHERWOOD.
MEANS AND APPARATUS FOR CHARTING THE POSITIONS OF SHIPS AT SEA.
APPLICATION FILED SEPT. 5, 1913.

1,123,795.

Patented Jan. 5, 1915.
9 SHEETS—SHEET 7.

WITNESSES.
INVENTORS.

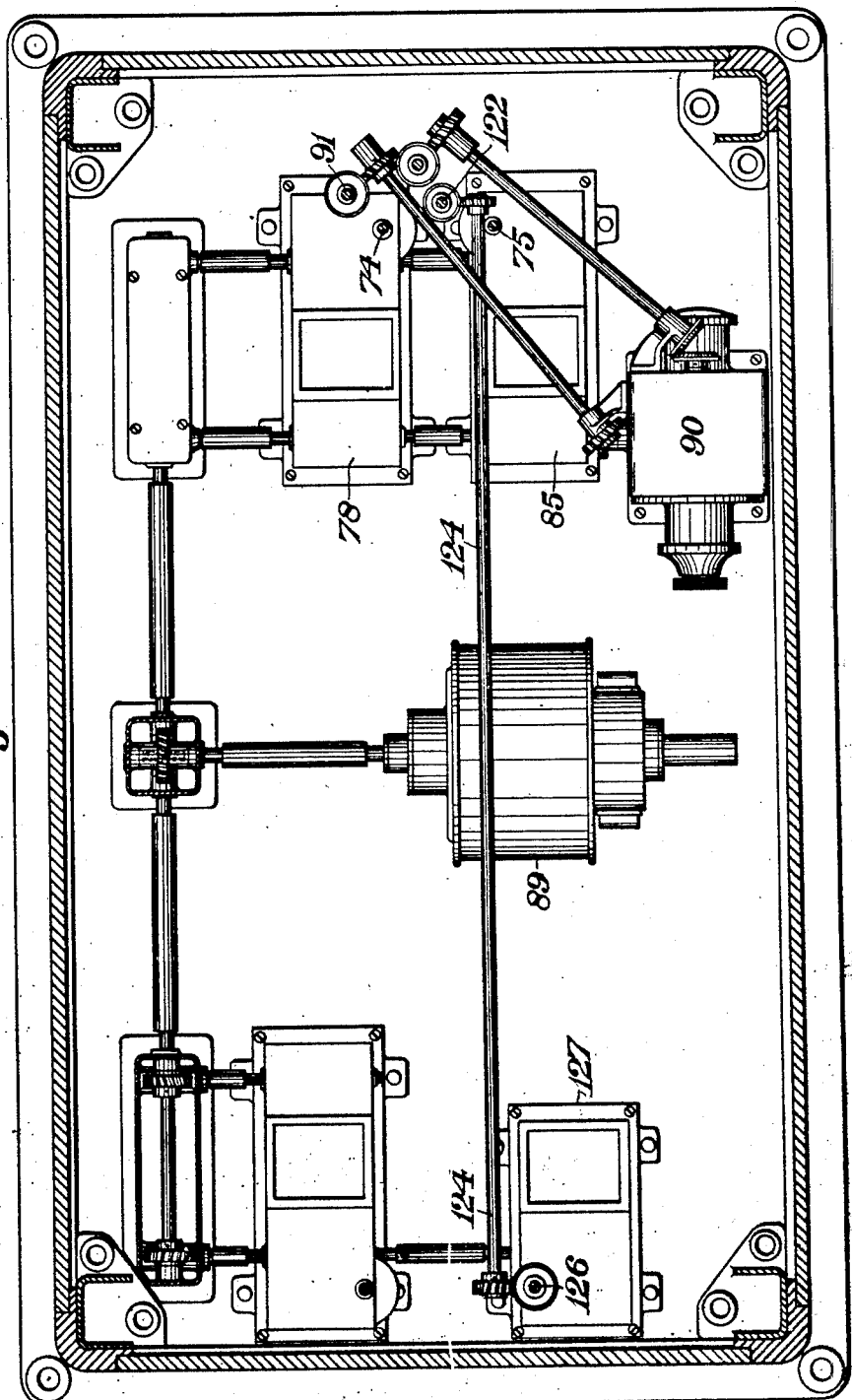

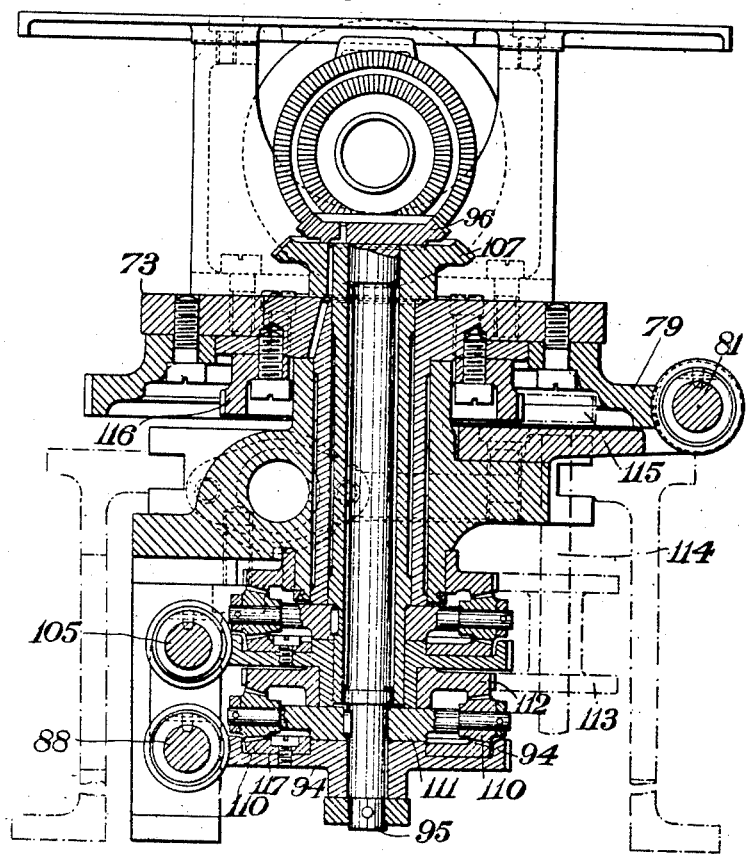

UNITED STATES PATENT OFFICE.

ARTHUR H. POLLEN, OF LONDON, AND HAROLD ISHERWOOD, OF YORK, ENGLAND.

MEANS AND APPARATUS FOR CHARTING THE POSITIONS OF SHIPS AT SEA.

1,123,795.   Specification of Letters Patent.   Patented Jan. 5, 1915.

Application filed September 5, 1913. Serial No. 788,261.

*To all whom it may concern:*

Be it known that we, ARTHUR HUNGERFORD POLLEN and HAROLD ISHERWOOD, subjects of the King of Great Britain, residing at 14 Buckingham street, Strand, London, England, and Bishophill House, York, England, respectively, have invented certain new and useful Improvements in Means and Apparatus for Charting the Positions of Ships at Sea, of which the following is a specification.

This invention relates to apparatus adapted for use on board ship for plotting upon paper the successive instantaneous positions of the ship in which the apparatus is installed (hereinafter called "the ship"), and also if desired for plotting the successive instantaneous positions of an observed ship (hereinafter called "the target"). The paper may be taken as representing the ocean, and by this invention the true successive positions of the ship and, if desired, of the target on the ocean, are accurately plotted at successive short intervals of time, or as a continuous trace.

By this invention the ship's course is accurately traced on the paper and every change of direction, such as a change due to change of course, or the small changes due to keeping station, and even the still smaller changes due to yaw, are accurately represented to scale in the way that they would appear to an observer who is in a position to command a bird's-eye view of the evolution of the ship on the ocean.

In plotting and charting machines as hitherto constructed, the course of the ship has been assumed to be a straight line and a given plot of the target's position was only accurate so long as the course of the ship remained unchanged. Any change of course had to be notified in the charting room, and a new chart begun on the amended data as to the ship's course so supplied.

According to the present invention it is no longer necessary to stop the chart and begin another on a change of course, because the actual motion of the ship through the water is depicted on the paper, and if the plot of the target's position is made from successive observations of range and bearing angle, (that is, the angle the target lies to port or starboard of the ship's course at any instant) the resulting plot of the target will represent its true path on the ocean, and consequently any desired data such as the rate of change or range of the target can be at all times accurately deduced.

In many cases a chart of the ship's motion alone without any reference to the plotting of a target's course will afford a valuable record of the navigation of the ship, and if the apparatus is constructed to operate on a scale identical with the scale of an actual chart of the ocean and if executed on tracing paper, it will effect the superposition of the trace on the actual chart and thus give an additional aid to navigation of difficult passages.

In order to facilitate the description of the invention, the means adopted for plotting the course of the ship will be first described, reference being made subsequently to the additions necessary to plot on the same paper the course of the target.

In order to plot the true course of the ship it is necessary to consider the relative motions of the plotting point representing the ship, and the paper representing the ocean. One form of apparatus for plotting the course of the ship consists of a bar fixed in the charting room and arranged, say, parallel to the keel of the ship. A carriage which is adapted to slide on the bar carries a plotting point which is caused to move toward the bow of the ship at a speed representing the ship's speed. A sheet of paper is arranged horizontally below the plotting point so that when the plotting point is depressed it will make a mark or dot on the paper. It is clear that so long as the ship's course remains unchanged the plot of the ship's course will consist of a number of dots arranged in a straight line and lying beneath the aforesaid bar. If, however, the ship's course is changed say 10° to starboard, then it is clear that the next dot to be plotted will no longer lie in the aforesaid straight line but in a new line passing through the last dot and making an angle of 10° with the straight line. The new point will be correctly placed if the paper is rotated backward, *i. e.* to port about the last position of the plotting point by an amount equal to 10°. It will be seen that as the ship has changed course 10° to starboard, and has carried the paper with it, and as the paper has now moved 10° to port, it follows that the paper keeps its angular position in space unchanged and merely changes its angular position relative to the ship. However, in all cases such changes in angular position relative to the ship must be executed about the instantaneous position of the plotting point (or about some point in the line at right angles to the trace at the moment), but since the portion of the trace which is being drawn at any moment is always parallel to the keel of the ship, it follows that the paper must be rotated about some point in the line through the plotting point and perpendicular to the keel. In general, it is preferable to rotate the paper about the plotting point itself which, then, is relatively stationary. It will be seen later that, by choosing a particular position of the point about which rotation of the paper is to take place to suit each angle of turn, the trace can be obtained by a pure rotation of the paper about one of two gripping points situated on opposite sides of the plotting point.

It is convenient first to discuss the plotting mechanism in which angular movements are transmitted to the paper about the plotting point. In this case, movements are transmitted to the paper for rotating it as a whole about the plotting point so as to keep it in a fixed compass direction, and linear movements may also be transmitted to the plotting point so that it moves at a speed representing the ship's speed. In many cases, however, it is preferable to move the paper bodily backward beneath the plotting point at a speed representing the ship's speed, instead of moving the plotting point forward over the paper at the same speed. It is this form of construction that we now propose to describe with reference to the accompanying drawings in which—

Figure 2:
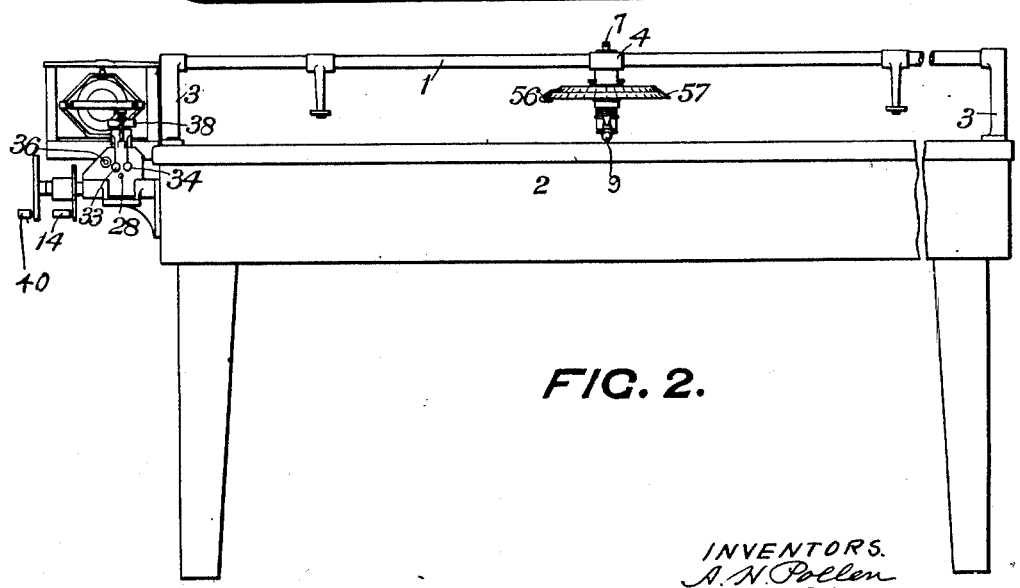
Figure 3:
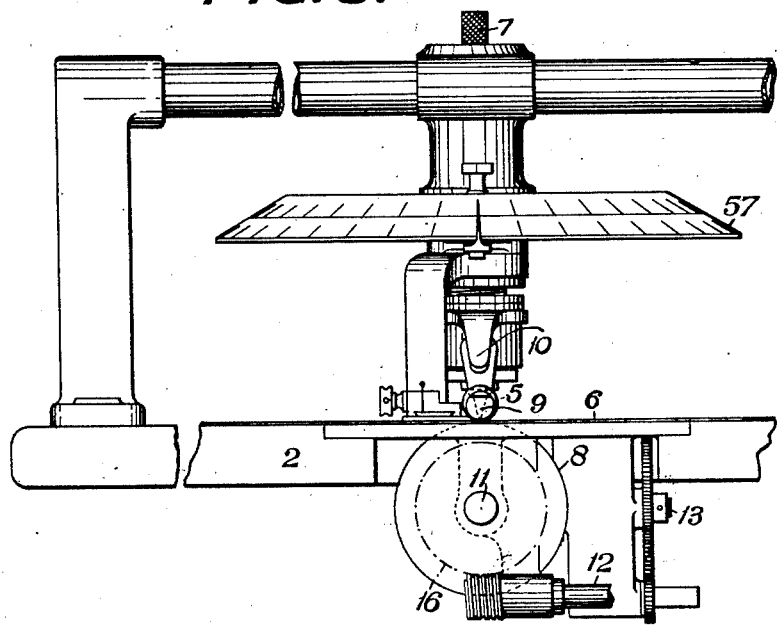
Figure 4:
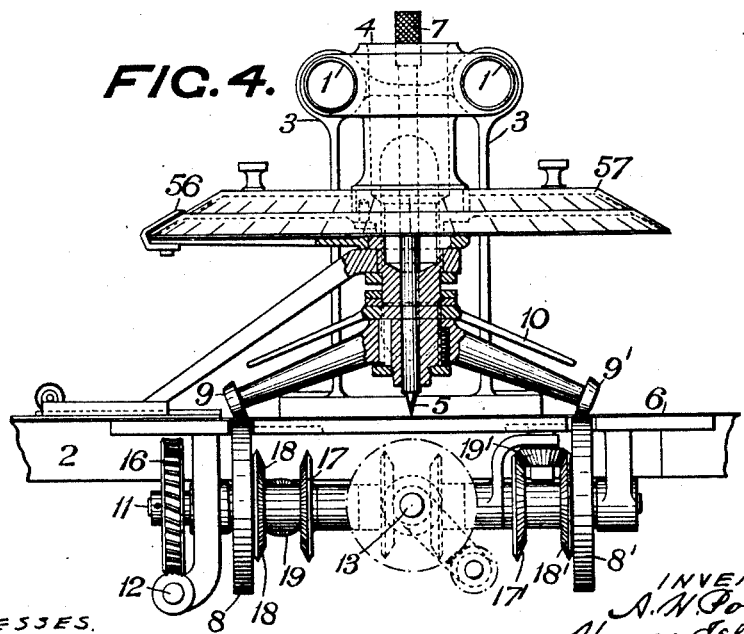
Figure 13:
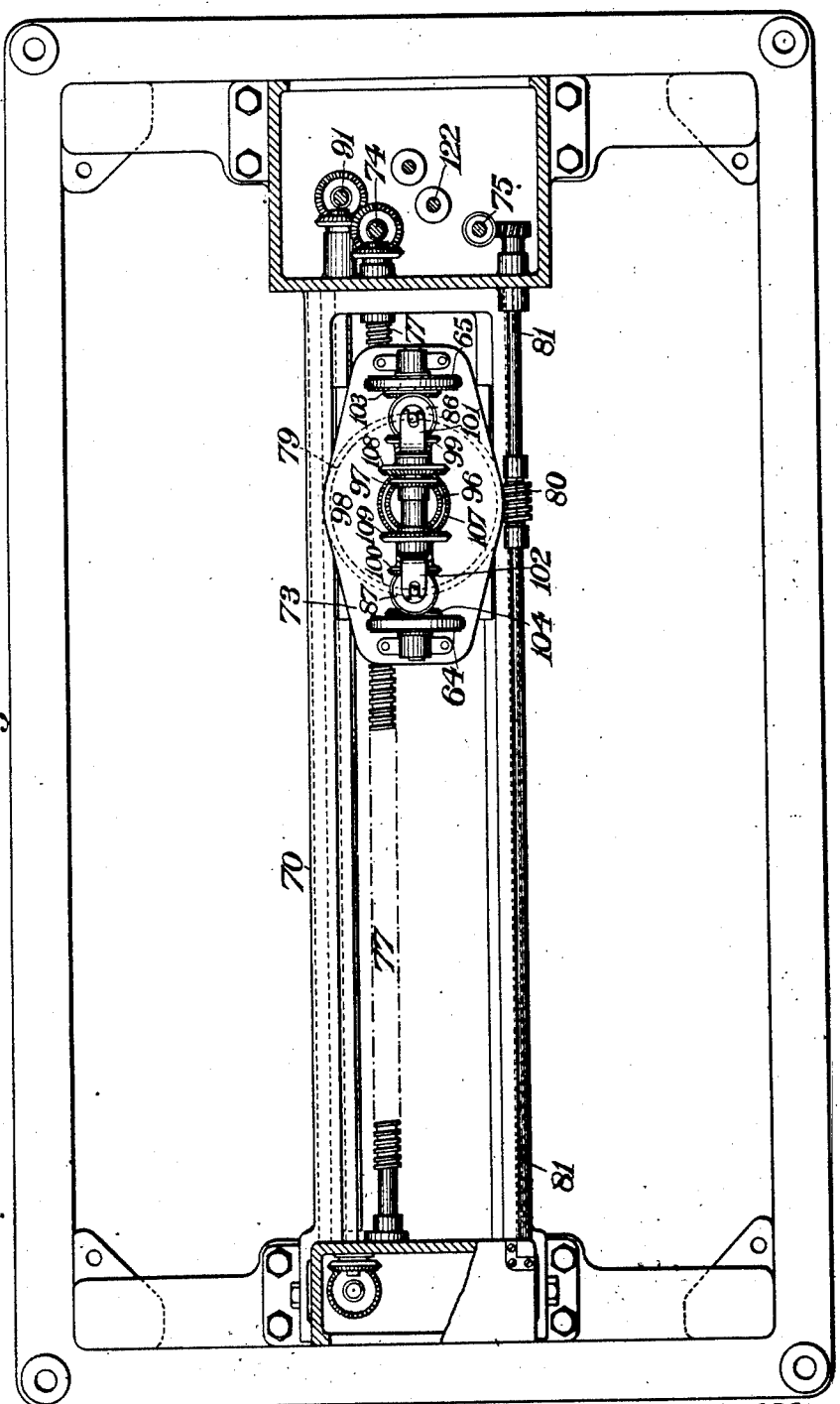

Figure 1 is a plan view of a manual plotting table constructed according to this invention. Fig. 2 is an elevation of same. Fig. 3 is a side elevation of the method of supporting the plotting point, and of propelling and rotating the paper. Fig. 4 is an end elevation of same partly in section. Figs. 5 and 5ª are end elevations partly in section of the differential mechanism for imparting the combined motions of translation and rotation to the paper beneath the plotting point. Fig. 6 is a view of the mechanism for enabling the "speed shaft" to be rotated at a speed representing the ship speed. Fig. 7 is another view partly in section of the mechanism shown in Fig. 6. Fig. 8 shows the gyroscopically controlled arrangement for enabling the paper to be kept in a constant compass direction. Fig. 9 is a plan of the target plotting arm and its attachment as used for an automatic plotting table. Fig. 10 is an elevation of same partly in section. Fig. 11 is a sectional elevation of a detail. Fig. 12 represents in side elevation, partly in section, a modification of the invention, the course of the ship being supposed for the convenience of representation to be at right angles to the line of sight. Fig. 13 represents a plan view of the mechanism that lies immediately below the table shown in Fig. 12. Fig. 14 is a diagrammatic view of the gear for driving the various mechanisms, all of which gear is situated within the base of the instrument. Fig. 15 shows a modification of certain parts of the mechanism shown in Fig. 14 for operating the rollers hereinafter described.

Referring to Fig. 1, which is a plan view of the plotting table and Fig. 2 which is an elevation of the same, 1, 1 is a tubular girder supported in a horizontal position above the table 2 by brackets 3, 3. To the middle of the girder 1, 1 is attached a cross-piece 4 from which depends a casting (shown in detail in Figs. 3 and 4) which has for one of its objects to support the plotting pencil 5. The point of pencil 5 is normally out of contact with paper 6 but can be caused to contact and mark the same by depressing the knurled head 7. The paper 6 is laid freely upon the table beneath the plotting point 5 and is then held in position by being gripped between a pair of rollers 8, $8^1$ journaled on a shaft 11 below the surface of the table and a pair of rollers 9, 9 arranged above the surface of the table and capable of being lowered into contact with the paper so as to grip the same between the rollers 8 and $8^1$ by means of the cam lever 10, as clearly shown in Figs. 3 and 4. The rollers 8, $8^1$ project upward through slots in the table so that their upper edges are flush with the top surface of the table. The direction of shaft 11, which is the axis around which the rollers 8, $8^1$ rotate, is perpendicular to the direction of the girder 1, 1, the girder 1, 1 being preferably arranged in the charting room fore and aft so that the shaft 11 will be athwart ship. The middle point of the shaft 11 is immediately below the point of the pencil 5, so that the rollers 8, 9, $8^1$, $9^1$, grip the paper at points lying in a line through the plotting point 5 athwart ship, and equidistant therefrom. It will be seen that if the rollers 8, $8^1$ revolve equally in opposite directions the paper will experience a pure rotation around the plotting point, whereas if the rollers 8, $8^1$ rotate equally in the same direction the paper will experience a motion of pure translation beneath the plotting point in a direction parallel to the keel of the ship.

By means of the mechanism now to be described rotation imparted to a shaft 12, called the "speed shaft," will produce equal motions of the rollers 8, $8^1$ in the same direction whereas motion imparted to the shaft 13, called the "turning shaft," will produce equal motions of the rollers 8, $8^1$ in opposite direction. If therefore the shaft 12 be rotated at a velocity proportional to the speed of the ship and the shaft 13 is rotated so as to keep an arrow, marked on the paper, always pointing in a fixed compass direction, then the plotting point 5 will trace on the paper the actual course of the ship.

We now proceed to describe with reference to Fig. 5, the mechanism by which rotation of the speed shaft 12 produces equal rotations of the rollers 8, $8^1$ in the same direction, and rotation of the turning shaft 13 produces equal rotation of the rollers 8, $8^1$ in the opposite directions.

The shaft 11 is mounted in ball bearings 15, 15, and is driven by a worm reduction gear from the speed shaft 12. The only members fast on the shaft 11 are the worm wheel 16 by which it is driven, and two bevel wheels 17, $17^1$ arranged as shown in Fig. 5. The rollers 8, $8^1$, are mounted loose on the shaft 11 and carry bevel wheels 18, $18^1$. The bevel wheels 17 and 18 mesh with a bevel wheel 19, carried on the stud 20, mounted on an extension of the sleeve 21, which is free to rotate on the shaft 11 and carries the bevel wheel 22. The bevel wheels $17^1$, $18^1$ mesh with a bevel wheel $19^1$, carried on the stud $20^1$, mounted on an extension of the sleeve $21^1$, which is free to rotate on the shaft 11 and carries the bevel wheel $22^1$. The bevel wheel 23 mounted on the turning shaft 13 meshes with the bevel wheels 22, $22^1$.

Referring to Fig. 5, but assuming that the observer is looking at the mechanism from its right hand end, the effect of rotating the turning shaft 13 so that its upper portion moves to the right, i. e. toward the observer in the direction shown by the arrow 25 (the shaft 12 being meanwhile prevented from rotation), will be to move 22 clockwise, causing 19 to walk clockwise on 17 which is stationary, and will drive 18, and consequently 8, clockwise, and will also be to move $22^1$ counterclockwise causing $19^1$ to walk counterclockwise on $17^1$ which is stationary, and will thus drive $18^1$, and consequently $8^1$, counterclockwise. Thus, a rotation of the turning shaft 13 produces equal but opposite rotations of the rollers 8, $8^1$.

The effect of rotating the shaft 12 so as to produce a clockwise rotation of the gear wheel 16 (the turning shaft 13 being meanwhile prevented from rotating) will be to rotate the shaft 11 clockwise, and therefore the bevel wheels 17, $17^1$ clockwise. Since the sleeves 21, $21^1$ and the pins 20, $20^1$ are now held stationary, the clockwise rotation of 17, $17^1$ will produce counterclockwise rotations of 18, $18^1$ and consequently of the rollers 8, $8^1$. Thus, a rotation of the speed shaft 12 produces equal rotations of the rollers 8, $8^1$, but in the same direction. Consequently if the speed shaft 12 is rotated at a speed proportional to the ship's speed and the turning shaft 13 is caused to rotate in such a manner that an arrow drawn on the paper will maintain a constant compass direction, the pencil 5 will (so long as it is in contact with the paper) produce a true plot of the ship's course.

We now proceed to describe known convenient means for causing the speed shaft to rotate at a speed representing the ship's speed and for causing the turning shaft to rotate in such a manner that it will maintain the compass direction of the paper constant. Mechanism for operating the speed shaft by hand is shown in Figs. 6 and 7. This mechanism can be set for the ship's speed and, when so set, the rotation of the speed handle by hand, so as to keep the second hand of a watch always pointing in a fixed direction while the watch itself is automatically rotated in space, will communicate the requisite motion to the speed shaft. Referring to Figs 6 and 7, it will be seen that 14 designates the speed handle mounted on the shaft 24 for driving the speed shaft 12 through gearing 25, 26. Shaft 24 carries three worms 27, 28, 29 of which any one may be arranged to gear with the worm wheel 30 mounted on the shaft 31. Shaft 31 carries a pinion 32 meshing with pinions on the rollers 33, 34. Arranged above these rollers and in contact with both of them is a ball 35 capable of being moved longitudinally in relation to such rollers by the milled head 36. The rollers 33, 34 rotate in the same direction, proportionally to the rotation of the hand wheel 14 (the proportion being determined by which of the three worms 27, 28, 29 is in engagement with the worm wheel 30), and drive the ball 35, which in its turn rotates a friction plate 37 with which it is in contact as clearly shown in Fig. 7. The plate 37 carries a case 38 in which is placed an ordinary second hand stop watch. It will be seen that the ball 35 provides a variable speed drive between the rollers 33, 34, and the plate 37, depending upon the position of the ball 35, as determined by the milled head 36. A pointer reading against a scale marked in knots travels with the ball so that the ball can by means of the milled head 36 be set in the proper position for any particular ship's speed. When the ball has been set in the position corresponding to the ship's speed, it will be found that rotation of the hand wheel at such a speed—the second-hand of the stop watch remaining stationary in space, will produce the requisite rotation of the speed shaft 12.

The three worms 27, 28, 29, are provided in order to permit plotting to be done on three different scales, to suit the particular tactical evolution that the ship may be carrying out, and they are so constructed as to be slidable endwise on the shaft 24 so that any of them may be employed to transmit the drive to the watch case 38.

Instead of operating the speed shaft by hand it may be driven by a log or by the propulsive machinery of the ship in such a way that its speed is proportional to the ship's speed.

A mechanism for transmitting by hand such a rotation to the turning shaft 13 as will keep the paper in a constant compass direction is shown in Fig. 8 and consists of a hand wheel which is rotated in such a way that a pointer always points to the zero of a scale of degrees, which scale is gyroscopically controlled (as now to be described) so that it always maintains a fixed compass position in space.

Referring to Fig. 8, the hand wheel 40 drives, by means of a bevel gear, the framework 41, which is capable of rotation about a vertical axis 42. Mounted within this framework 41 is a gyroscope 43. The axis of the gyroscopic flywheel or rotor 43ª is mounted in a gimbal ring 45 which gimbal ring is mounted horizontally in the gimbal ring 46, free to rotate about a vertical axis within the framework 41. Rotation of the hand wheel 40 will cause rotation of the framework 41 about a vertical axis, but such rotation will not be communicated to the gyroscope 43, which will remain fixed in space, as far as rotation about a vertical axis is concerned. The motion of the hand wheel 40 is also transmitted by bevel gear 40ª to the turning shaft 13. A pointer 41ª (Fig. 1) attached to the framework 41 reads against a scale of degrees carried by the vertical gimbal ring 46 of the gyroscope. The ratio of the gearing connecting the frame 41 with the rollers 8, 8¹ is such, that for one turn of the frame 41 there will be a corresponding shifting of the paper on which the plot is being made. If, therefore, the hand wheel 40 is rotated in such a manner that the pointer carried by 41 is maintained opposite the zero of the scale carried by 46, the requisite motion will be transmitted to the turning shaft 13 for maintaining the compass direction of the paper constant. Instead of transmitting the required motion to the turning shaft by hand, this can be done automatically by means of a relay device operated by the gyroscope in the well known manner.

It will be seen that, in the apparatus thus described, the paper is rotated about the plotting point so as to maintain the paper in a constant compass direction, and it is shifted beneath the plotting point at a speed representing the ship's speed. In nearly every case these motions of rotation and translation approximate a single motion of rotation about some point lying in a line through the plotting point and perpendicular to the motion of translation, which may, as already stated, be assumed to coincide with the direction of the keel of the ship. If therefore that portion of paper which lies beneath the plotting point is propelled forward at a speed representing the speed of the ship, in some suitable way, such as by gripping it between a pair of upper and lower rollers, the upper one of which may be inked, and may therefore operate as a plotting point, it is possible to choose a point in the transverse line aforesaid at which the paper shall be restrained form moving, so that the forward motion of the paper produced by the rollers causes a pure rotation about this point, which rotation will be the equivalent of the two movements already described. This point is chosen at any given moment in such a manner as to make the compass direction of the paper constant. One form of mechanism for selecting this point consists of a series of pins (not shown) arranged above or beneath the table at various distances along the transverse line aforesaid, and any one of these pins can be caused to project through the table and engage the paper. Projecting, a pin on the starboard side of the plotting point will under the backward motion impressed on it by the plotting wheel cause the paper to move to port. If, therefore, the direction of the paper be found to have varied to starboard of its proper compass direction, a pin will be automatically projected on the starboard side of the plotting point which will cause the paper to resume its true compass direction. The greater the deviation to be corrected the nearer to the plotting point should the pin be which is selected. In some cases it is only necessary to have one pin to starboard and one to port of the plotting point, arranged at a distance therefrom approximately equal to the turning radius of the ship. The rotation of the paper may be communicated by suitable link-work (not shown) to a rotatable ring (not shown) marked in degrees, and the motion of this ring may, by a gyroscopic relay, control the operation of such points electrically or otherwise. When steering a straight course, neither of these points will be in operation; or they will operate alternately with a frequency sufficient to give a substantially straight plot; but, when the ship is making a turn, although the pins may still operate alternately, nevertheless one will be in operation for a longer period than the other and the turn will be properly plotted on the paper.

The plotting point 5 may be left continuously in contact with the paper so as to form a continuous trace, but it may also be necessary to mark on the paper a series of points indicating the position of the ship after the lapse of equal intervals of time. Arrangements are therefore provided by which a small reciprocating cylinder 5ª (Fig. 10) inclosing the plotting point 5, and inked at its lower edge, is caused to mark a small circle on the paper concentric with the instantaneous position of the plotting point, once every sixty seconds. In this manner, the plot will record the speed as well as the course of the ship.

We now proceed to describe improved means for plotting the course of the target for use in connection with the apparatus for plotting the course of the ship as already described.

Referring to Figs. 9 and 10, it will be noted that 50 represents a range arm capable of sliding longitudinally in a block 51. The said block 51 is capable of rotation about the axis of the plotting point 5. By means of suitable gearing, shafts 53 and 54, shown in Figs. 8 to 11, and arranged beneath the girder 1, transmit a motion of rotation about the axis of the ship's plotting point 5, and of translation in the direction of its length to the arm 50. The arm 50 carries a target plotting point 55, provided with any suitable device for marking circles around the instantaneous position of the plotting point once every sixty seconds, such marking of the target position being simultaneous with that of the ship's position as described above. The range arm is graduated in ranges as shown at 50ª and a pointer 52 attached to the block 51 reads against such graduations. The block 51 also carries a pointer 56 adapted to read against the graduated bearing circle 57 mounted concentrically of the plotting point 5. The range arm carries at its extremity a graduated circle-disk 60 called the "target course circle," mounted co-axially with the target plotting point 55. The said circle 60 is, by means of suitable gearing, including shafts $a$-$^{53}$, pinions $a$-$^{54}$, gear-wheel $a$-$^{55}$ meshing with the toothed periphery of the circle-disk 60, etc., connected to the framework of the plotting table in such a way that as the plotting arm 50 changes its angular position, the angular position of the circle 60 will remain invariable, the radius passing through the zero of the graduations thereon being constrained to remain parallel to the girder 1, see Figs. 8 and 11, i. e. to the instantaneous course of the ship. A movable pointer 62, called the target course pointer, centered around the target plotting point 55 and reading against the graduations, is provided with a depending portion in close proximity to the paper, and can be set so that its direction coincides with the general direction of the plot of the target course, a portion of which is shown in Fig. 9. The angle which the pointer reads on the target course circle when so set is the angle between the ship's course and the target's course.

The operation of this part of the apparatus is as follows:—The observations of target range and bearing are transmitted from the range-finder to the shafts 53 and 54, either automatically or otherwise, which cause the range arm 50 to slide endwise, and to rotate, until the position of the plotting point 55 corresponds with such observations. The target range and bearing can be directly read on the range arm 50 and on bearing circle 57. The target speed can be measured from the actual plot of the target by measuring the distance between consecutive points marked at the constant interval of sixty seconds as shown in Fig. 9. The target course can be read directly on the target course circle 60. These four quantities are the important quantities which it is necessary to deduce from a chart in order to manipulate the guns.

In the form of machine just described the ship plotting point is fixed and the target plotting point is movable for changes of range and bearing.

We now proceed to describe a modification of the machine, and in which instance the target plotting point is fixed and the ship plotting point is movable to and from the target plotting point to represent changes of range. This modification is more convenient in practice because it is easier to read off the target course and speed on the dials provided for that purpose when the target plotting point is fixed in the machine. In this case the machine consists as before of a table 63 upon which is laid the paper on which the plot is to be drawn, the paper being gripped between the rollers 64 and 65 arranged below the table and the rollers 66 and 67 carried on the bracket 68 depending from a carriage 69 slidably mounted on the fixed cantilever arm 70. The said carriage 69 carries the pencil 71 for plotting the course of the ship whereas the pencil 72 for plotting the course of the target is carried at the fixed extremity of the arm 70. The arm 70 represents the line of sight, that is, the line joining the ship and the target; and as the position of the target is plotted by the fixed pencil 72, it is necessary to provide the requisite motions for representing the changes of range and changes of bearing by mechanism arranged in the neighborhood of the pencil 71. In order to provide for the delineation of the change of range, it is arranged that the paper and the ship plotting pencil 71 can be carried bodily over the table toward the pencil 72. This is accomplished by mounting the rollers 64 and 65 in a frame 73 beneath the table which is capable of being moved parallel to the arm 70 on suitable slides. Means are provided for insuring that the carriage 73 which carries the rollers 64 and 65 shall slide in identically the same manner as the carriage 69 which carries the rollers 66 and 67. The mechanism adopted for producing this identical motion of the two carriages consists of a vertical shaft 74 situated immediately behind the shaft 75 and therefore not shown in Fig. 12, the shaft 74 drives the shaft 76 mounted in the arm 70 and a shaft 77 mounted beneath the table through the bevel gears shown. The shafts 76 and 77 are provided with screw threads of identical pitch engaging with nuts on the carriages 69 and 73 respectively. Consequently, any rotation of the shaft 75 will produce identical translations of the carriages 69 and 73 and therefore of the rollers 66 and 67 and 64, 65, and the paper which is gripped between the said rollers will be moved across the table in the direction of the line of sight beneath the pencil 72. The shaft 74 is driven by a transmitting mechanism 78 of any suitable type (see Fig. 14) from the transmitter (not shown) geared to the rangefinder or from the range clock or other indicator of range and consequently the paper with the pencil 71 stationary relatively to it, is moved beneath the pencil 72 by an amount representing the change of range so that as far as change of range is concerned the target course will have been correctly plotted by the pencil 72.

We now proceed to describe how the alterations in the bearing of the target are transmitted to the paper. This is accomplished by rotating the paper as a whole around the point of contact with the pencil 71. For this purpose the carriage 73 while free to slide as above described is rotatively mounted about a vertical axis in suitable bearings and is provided with a worm wheel 79 which engages with a worm 80 on the shaft 81. Similarly the arms 68 are mounted rotatably about a vertical axis in the carriage 69 and are driven by the worm 82 mounted on the shaft 83 which worm engages with the worm wheel 84 mounted on the member carrying the arms 68. The shaft 83 and the shaft 81 are both driven from the vertical shaft 75 by means of suitable gearing 83ª and 81ª respectively so arranged that identical rotary motions about the axis of the pencil 71 are transmitted to the carriage 73 and arms 68. The shaft 75 is driven from transmitting gear 85 (see Fig. 14) at a rate corresponding to rate of change of bearing as obtained from the range clock or in other suitable way. In this way the rotation of paper around pencil 71 causes it to travel beneath the pencil 72 so that the change of position of the target due to change of bearing is correctly plotted by the pencil 72.

It will be seen that in both the motions which we have described the pencil 71 has not moved relatively to the paper but the paper has been carried bodily beneath the pencil 72 along the line of sight to indicate the change of range of the target and around the pencil 71 to indicate change of bearing. These two motions combined will produce a correct instantaneous plot of the course of the target, regarding the ship as being at rest.

We now proceed to describe the means adopted for moving the paper beneath the pencil 71 and consequently also beneath the pencil 72 for the purpose of plotting the course of the ship so as to produce at the same time a plot of the actual target course, the ship being regarded as in motion.

In order to trace the plot of the ship's course, the paper is driven beneath the pencil 71 in a direction perpendicular to the axis of the rollers 64 and 65 by an identical rotation of these rollers. This is obtained through the intervention of the differential gearing 86, 87 shown in Fig. 12.

It will be seen that so long as the rollers 64 and 65 rotate at the same speed, the paper will be driven beneath the pencil 71 in a straight line in a direction perpendicular to the axis of these wheels, such direction being determined as above described by the information as to bearing which is transmitted to the machine. If the rollers 64 and 65 rotate in opposite directions a rotation will be communicated to the paper about the axis of the pencil 71 which is used for plotting the temporary deviations of the ship from a normal course due to yaw or the permanent alterations of course of the ship. The rotation of the rollers in the same direction to represent ship's speed is derived from the shaft 88, called the ship's speed shaft, which is driven at ship's speed from a motor 89 through the intervention of a variable speed drive 90 and intermediate gearing through the vertical shaft 91 and the bevel wheels 92. The shaft 88 drives a worm mounted in bearings 93 on the carriage 73, the worm being feathered on the shaft 88. The worm meshes with the worm wheel 94 on the vertical shaft 95 carrying a bevel wheel 96 which meshes with the bevel wheel 97 fast on the shaft 98. The bevel wheels 99 and 100 are also fast on the shaft 98 and transmit the drive through the idle bevels carried by the forks 101 and 102 (which for this purpose may be regarded as stationary) to the bevels 103 and 104 mounted loose on the shaft 98 and which carry the rollers 64 and 65. In this way the identical motion representing the ship's speed is communicated to the rollers 64 and 65. In order to transmit to the paper an angular displacement about the axis of the pencil 71 representing the changes in the ship's course, a shaft 105 called the yaw shaft is provided which is gyroscopically controlled so that its rotation is proportional to the change in the course of the ship whether due to yaw or otherwise. The shaft 105 communicates its rotation through a worm driven by a feather (in a manner already explained) through the worm wheel 106 mounted on a hollow vertical shaft which carries at its upper end a bevel wheel 107. This bevel wheel 107 drives the forks 101 and 102 in opposite directions through the bevel gears 108 and 109 and causes the idle bevels carried by such forks to walk on the bevels 99 and 100 (which for this purpose may be regarded as stationary) thereby driving the bevels 103 and 104 and therefore the rollers 64 and 65 in opposite directions. Thus, the paper is rotated around the axis of the pencil 71 so as to represent the change of the course of the ship.

A modification of this construction is shown in Fig. 15, and has for its object to prevent the rollers 64 and 65 from rotating on their own axes when the frame 73 is carried around for changes of bearing. In this modification a differential gear is inserted in both drives, from ship's speed shaft 88 to bevel wheel 96, and from yaw shaft 105 to bevel 107.

Referring to the sectional view Fig. 15 the ship's speed shaft 88 drives the worm wheel 94 loose on shaft 95 and transmits motion to bevel pinions 110, 110, loose on arm 111 which is keyed to the shaft 95. Bevel pinions 110, 110 thus walk on bevel wheel 112, which for the moment may be considered stationary, and in so doing rotate the arm 111 and therefore the shaft 95 and bevel 96 at half the speed of worm wheel 94.

When the carriage 73 is rotated for change of bearing, the bevel wheel 112 is caused to rotate with the carriage 73 and at twice the speed of the carriage by the following means:—A spur gear cut on wheel 112 meshes with a gear 113 on shaft 114 journaled in the carriage 73 and carrying a spur wheel 115 meshing with spur wheel 116 rigidly attached to the carriage 73. The diameters of such gear wheels are chosen so that the velocity ratio of the transmission from the carriage 73 to wheel 112 is as a ratio 1 to 2 so that wheel 112 rotates at twice the speed of the carriage 73. Consequently, when the carriage 73 is rotated by the shaft 81 for changes of bearing, the bevel pinions 110, 110 will be driven from the wheel 112, and will walk on the bevel 117, which may now be considered stationary, and will drive the arm 111 and therefore the shaft 95 and bevel 96 at half the speed of the wheel 112, that is, at the same speed as the carriage 73. Consequently, for changes of bearing there will be no relative motion between bevel 96 and the carriage 73. An exactly similar drive is provided between the yaw shaft 105 and the bevel 107, whose action will be evident from the above description so that there will be no rotation of either of the rollers 64 and 65 about their axes due to change of bearing. It will now be seen that the paper is shifted beneath the pencil 72 in such a way that that pencil plots the true course of the target and beneath the pencil 71 in such a way that that pencil plots the true course of the ship.

We will now proceed to describe a modification of the means already described whereby the courses plotted as described above are marked off with marks which represent equal intervals of time so that the actual speed of the ship and target can be read off from the plot: The modified means adopted for producing this effect consist in mechanism by which the pencils 71 and 72 are made to describe minute circles on the paper at small equal intervals of time, say one minute. The pencils 71 and 72 are mounted slightly eccentrically on axes about which they are rotated by means of the shaft 118 and gearing 119 and 120. The shaft 118 is rotated at minute intervals—through the intervention of the bevel 121, shaft 122, skew gear 123, shaft 124, skew gear 125, shaft 126,—from an apparatus 127 designed to transmit a small instantaneous rotation to these shafts at intervals of one minute. Adjacent to the pencil 72 is mounted a scale 128 so that it can be rotated around the axis of the pencil. The scale 128 is set to coincide with the course of the target and the angle which such course makes with the line of sight is represented by the angular position of the arm 129 which moves angularly with the scale 128. To obtain the angle between the course of the target and the course of the ship, a graduated dial 130 is provided against which the arm 129 reads. The dial 130 is driven through gearing 131, 132, from the bearing shaft 83. With this arrangement, the reading of the arm 129 against the dial 130 represents the instantaneous course of the target, that is, the angle between the course of the ship and the course of the target. The angle which the arm 68 and the shaft 98 makes with the line of the sight, (that is, with the arm 70) represents the bearing of the target, and this is conveniently read on the dial 133 which is carried by the arm 68 against the pointer 134 carried by the carriage 69.

What we claim is:—

1. Apparatus for use on board ship for plotting the course and speed of the ship, including a table on which a movable sheet of paper is sustained, a plotting point fixed relatively to the movable sheet, and means for shifting the paper edgewise beneath and for rotating it about the axis of the plotting point by communicating to the paper independent motions of rotation and translation.

2. Apparatus for use on board ship for plotting the course and speed of the ship, including a table on which a movable sheet of paper is sustained, a plotting point fixed relatively to the movable sheet, and means for shifting the paper edgewise beneath and for rotating it about the axis of the plotting point by communicating to the paper independent motions of rotation and translation, including yaw-actuated instrumentalities for communicating motion to the sheet.

3. Means for use on board ship for plotting the course and speed of the ship, comprising, a table on which is laid a sheet of paper, a plotting point for plotting the course of the ship, gyroscopic means actuatable by the yaw of the ship for maintaining the plotting point in a fixed compass position in space, and means for traversing the paper beneath and rotating the paper around the axis of said ship plotting point by communicating to the paper independent motion of rotation and translation; the plotting point being always in a fixed relation to the paper-rotating means.

4. Means for use on board ship for plotting the course and speed of the ship, comprising, a table on which a sheet of paper is shiftably laid relatively stationary with respect to the shiftable paper sheet, a plotting point for plotting the course of the ship, and differential mechanism for imparting to the paper simultaneously a motion of rotation and a motion of translation about and beneath said relatively stationary ship plotting point.

5. Means for use on board ship for plotting the course and speed of the ship, comprising, a table on which is laid a sheet of paper, a plotting point for plotting the course of the ship, means made operative by the yaw of the ship for controlling the relation between the paper and plotting point, and differential mechanism for imparting to the paper simultaneously a motion of rotation and a motion of translation about and beneath said ship plotting point.

6. Means for use on board ship for plotting the course and speed of the ship, comprising, a table on which is laid a sheet of paper, a plotting point for plotting the course of the ship, gyroscopic means deriving actuation from the yaw of the ship for controlling the relative position between the paper and the plotting point, and differential mechanism for imparting to the paper simultaneously a motion of rotation and a motion of translation about and beneath said ship plotting point.

7. Means for use on board ship for plotting the course and speed of the ship and a target comprising, a table on which is laid a sheet of paper, a plotting point for plotting the course of the ship, means for traversing the paper beneath and rotating the paper around the axis of said ship plotting point, a plotting point for plotting the course of the target, and means for altering the relative positions of the ship plotting point and target plotting point to represent change of range or to represent change of range and change of bearing.

8. Means for use on board ship for plotting the course and speed of the ship and a target comprising, a table on which is laid a sheet of paper, a plotting point for plotting the course of the ship, means for eliminating the effect of the yaw of the ship, means for traversing the paper beneath and rotating the paper around the axis of said ship plotting point, a plotting point for plotting the course of the target, and means for altering the relative positions of the ship plotting point and target plotting point to represent change of range or to represent change of range and change of bearing.

9. Means for use on board ship for plotting the course and speed of the ship and a target comprising, a table on which is laid a sheet of paper, a plotting point for plotting the course of the ship, gyroscopic means for maintaining a predetermined relation between the paper and plotting point, means for traversing the paper beneath and rotating the paper around the axis of said ship plotting point, a plotting point for plotting the course of the target, and means for altering the relative positions of the ship plotting point and target plotting point to represent change of range or to represent change of range and change of bearing.

10. Means for use on board ship for plotting the course and speed of the ship and a target comprising, a table on which is laid a sheet of paper, a plotting point for plotting the course of the ship, differential mechanism for imparting to the paper simultaneously a motion of rotation and a motion of translation about and beneath said ship plotting point, a plotting point for plotting the course of the target, and means for altering the relative positions of the ship plotting point and target plotting point to represent change of range or to represent change of range and change of bearing.

11. Means for use on board ship for plotting the course and speed of the ship and a target comprising, a table on which is laid a sheet of paper, a plotting point for plotting the course of the ship, means for maintaining a predetermined relation between the paper and plotting point, differential mechanism for imparting to the paper simultaneously a motion of rotation and a motion of translation about and beneath said ship plotting point, a plotting point for plotting the course of the target, and means for altering the relative positions of the ship plotting point and target plotting point to represent change of range or to represent change of range and change of bearing.

12. Means for use on board ship for plotting the course and speed of the ship and a target comprising, a table on which is laid a sheet of paper, a plotting point for plotting the course of the ship, gyroscopic means for maintaining a predetermined relation between the paper and plotting point, differential mechanism for imparting to the paper simultaneously a motion of rotation and a motion of translation about and beneath said ship plotting point, a plotting point for plotting the course of the target, and means for altering the relative positions of the ship plotting point and target plotting point to represent change of range or to represent change of range and change of bearing.

13. Means for use on board ship for plotting the course of the ship and the course of a target, comprising a stationary plotting point for plotting the course of the ship, means for rotating and traversing the paper around and beneath such plotting point, a movable plotting point for plotting the course of the target, said movable plotting point being carried on an arm capable of sliding endwise relative to and capable of rotation about said fixed plotting point to transmit to said movable plotting point the requisite motions representing range and bearing.

14. Means for use on board ship for plotting the course of the ship and the course of a target, comprising a stationary plotting point for plotting the course of the ship, means for eliminating the effect of the yaw of the ship, means for rotating and traversing the paper around and beneath such plotting point, a movable plotting point for plotting the course of the target, said movable plotting point being carried on an arm capable of sliding endwise and relative to and capable of rotation about said fixed plotting point to transmit to said movable plotting point the requisite motions representing range and bearing.

15. Means for use on board ship for plotting the course of the ship and the course of a target, comprising a stationary plotting point for plotting the course of the ship, gyroscopic means for eliminating the effect of the yaw of the ship, means for rotating and traversing the paper around and beneath such plotting point, a movable plotting point for plotting the course of the target, said movable plotting point being carried on an arm capable of sliding endwise relative to and capable of rotation about said fixed plotting point to transmit to said movable plotting point the requisite motions representing range and bearing.

16. Means for use on board ship for plotting the course of the ship and the course of a target, comprising a stationary plotting point for plotting the course of the ship, differential mechanism for imparting to the paper a motion of rotation and a motion of translation around and beneath said plotting point, a movable plotting point for plotting the course of the target, said movable plotting point being carried on an arm capable of sliding endwise relative to and capable of rotation about said fixed plotting point to transmit to said movable plotting point the requisite motions representing range and bearing.

17. Means for use on board ship for plotting the course of the ship and the course of a target, comprising a stationary plotting point for plotting the course of the ship, means for eliminating the effect of the yaw of the ship, differential mechanism for imparting to the paper a motion of rotation and a motion of translation around and beneath said plotting point, a movable plotting point for plotting the course of the target, said movable plotting point being carried on an arm capable of sliding endwise and relative to and capable of rotation about said fixed plotting point to transmit to said movable plotting point the requisite motions representing range and bearing.

18. Means for use on board ship for plotting the course of the ship and the course of a target, comprising a stationary plotting point for plotting the course of the ship, gyroscopic means for eliminating the effect of the yaw of the ship, differential mechanism for imparting to the paper a motion of rotation and a motion of translation around and beneath said plotting point, a movable plotting point for plotting the course of the target, said movable plotting point being carried on an arm capable of sliding endwise relative to and capable of rotation about said fixed plotting point to transmit to said movable plotting point the requisite motions representing range and bearing.

19. Means for use on board ship for plotting the course and speed of the ship and a target comprising, a table on which is laid a sheet of paper, a plotting point for plotting the course of the ship, means for traversing the paper beneath and rotating the paper around the axis of said ship plotting point, a plotting point for plotting the course of the target, means for altering the relative positions of the ship plotting point and target plotting point to represent change of range or to represent change of range and change of bearing, and means for marking equal intervals of time on the respective plots made by said plotting points.

20. Means for use on board ship for plotting the course and speed of the ship and a target comprising, a table on which is laid a sheet of paper, a plotting point for plotting the course of the ship, means for traversing the paper beneath and rotating the paper around the axis of said ship plotting point, a plotting point for plotting the course of the target, means for altering the relative positions of the ship plotting point and target plotting point to represent change of range and to represent change of range and change of bearing, and means for causing said plotting points to describe small circles at the ends of equal intervals of time so as to mark the respective plots made by said plotting points at equal intervals of time.

In testimony whereof we have hereunto set our hands in presence of two subscribing witnesses.

ARTHUR H. POLLEN.
HAROLD ISHERWOOD.

Witnesses:
FRANCES H. POLLEN,
D'ARCY M. CLARK.